United States Patent
Miura et al.

(10) Patent No.: US 9,547,315 B2
(45) Date of Patent: Jan. 17, 2017

(54) SOLENOID VALVE CONTROL DEVICE AND SOLENOID VALVE CONTROL METHOD

(71) Applicant: DENSO CORPORATION, Kariya, Aichi-pref. (JP)

(72) Inventors: Yuichiro Miura, Obu (JP); Shinji Sugihara, Mizuho (JP)

(73) Assignee: DENSO CORPORATION, Kariya (JP)

( * ) Notice: Subject to any disclaimer, the term of this patent is extended or adjusted under 35 U.S.C. 154(b) by 300 days.

(21) Appl. No.: 13/946,134

(22) Filed: Jul. 19, 2013

(65) Prior Publication Data

US 2014/0060661 A1  Mar. 6, 2014

(30) Foreign Application Priority Data

Sep. 6, 2012 (JP) .................................. 2012-196114

(51) Int. Cl.
  *F02M 25/08*  (2006.01)
  *G05D 16/20*  (2006.01)

(52) U.S. Cl.
  CPC ...... *G05D 16/2066* (2013.01); *F02M 25/0836* (2013.01); *G05D 16/2013* (2013.01); *G05D 16/202* (2013.01); *Y10T 137/0379* (2015.04); *Y10T 137/7761* (2015.04); *Y10T 137/86324* (2015.04)

(58) Field of Classification Search
  CPC .............. G05D 16/202; G05D 16/2013; G05D 16/2066; G05D 16/2086; Y10T 137/0379; Y10T 137/7761; Y10T 137/3087; Y10T 137/3127; Y10T 137/86324; F02M 25/0836

USPC ..... 137/487.5, 198, 209, 587; 123/518, 519, 123/520

See application file for complete search history.

(56) References Cited

U.S. PATENT DOCUMENTS

| | | | | |
|---|---|---|---|---|
| 4,817,576 A | * | 4/1989 | Abe et al. ..................... | 123/519 |
| 5,012,071 A | * | 4/1991 | Henke ........................... | 219/400 |
| 5,193,511 A | * | 3/1993 | Fujino ........................... | 123/520 |
| 5,197,442 A | * | 3/1993 | Blumenstock ..... | F02M 25/0818 |
| | | | | 123/198 D |
| 5,259,355 A | * | 11/1993 | Nakashima et al. .......... | 123/520 |
| 5,280,775 A | * | 1/1994 | Tanamura et al. ............ | 123/518 |
| 5,333,590 A | * | 8/1994 | Thomson ........... | F02M 25/0809 |
| | | | | 123/198 D |
| 5,345,917 A | * | 9/1994 | Maruyama et al. .......... | 123/520 |
| 5,355,864 A | * | 10/1994 | Kuroda et al. ................ | 123/520 |
| 5,396,873 A | * | 3/1995 | Yamanaka et al. ........... | 123/520 |
| 5,398,662 A | * | 3/1995 | Igarashi et al. ............... | 123/520 |
| 5,497,754 A | | 3/1996 | Ito | |

(Continued)

FOREIGN PATENT DOCUMENTS

| | | |
|---|---|---|
| JP | 07-189841 A | 7/1995 |
| JP | 07-217504 A | 8/1995 |

(Continued)

*Primary Examiner* — William McCalister

(57) ABSTRACT

An internal pressure sensor detects an internal pressure of the fuel tank, which stores fuel. A solenoid valve is configured to close to seal the fuel tank and is configured to open to open the fuel tank. An internal pressure acquisition unit is configured to acquire an internal pressure of the fuel tank from the internal pressure sensor. A drive control unit is configured to control the solenoid valve to open when the internal pressure of the fuel tank is greater than or equal to a first predetermined value, which is a negative value, and is less than a second predetermined value, which is 0 or a positive value.

8 Claims, 3 Drawing Sheets

(56) References Cited

U.S. PATENT DOCUMENTS

| | | | |
|---|---|---|---|
| 5,542,397 A * | 8/1996 | Takahata | F02M 25/0809 123/520 |
| 5,669,362 A * | 9/1997 | Shinohara et al. | 123/520 |
| 5,767,395 A * | 6/1998 | Goto et al. | 73/114.39 |
| 6,041,761 A * | 3/2000 | Uto et al. | 123/516 |
| 6,276,343 B1 * | 8/2001 | Kawamura | F02M 25/0809 123/516 |
| 6,422,214 B1 * | 7/2002 | Sealy et al. | 123/520 |
| 6,679,214 B2 * | 1/2004 | Kobayashi et al. | 123/179.4 |
| 6,814,063 B2 * | 11/2004 | Kawano et al. | 123/520 |
| 6,990,963 B2 * | 1/2006 | Hara et al. | 123/520 |

FOREIGN PATENT DOCUMENTS

| | | |
|---|---|---|
| JP | 3072951 B2 | 8/2000 |
| JP | 3630711 B2 | 3/2005 |

\* cited by examiner

SOLENOID VALVE CONTROL DEVICE AND SOLENOID VALVE CONTROL METHOD

CROSS REFERENCE TO RELATED APPLICATION

This application is based on reference Japanese Patent Application No. 2012-196114 filed on Sep. 6, 2012, the disclosure of which is incorporated herein by reference.

TECHNICAL FIELD

The present disclosure relates to a solenoid valve control device and a solenoid valve control method.

BACKGROUND

For example, a patent document 1, which corresponds to Publication of U.S. Pat. No. 5,497,754, discloses a known sealed tank system. The sealed tank system includes a valve device, which is equipped to a communication passage, which communicates with a fuel tank, to constitute a sealed structure of the fuel tank, to restrict fuel from flowing out from the fuel tank to the atmosphere, in view of avoidance of air pollution. In the sealed tank system of the patent document 1, a pressure control valve is equipped between the fuel tank and a canister, in order to avoid breakage of the fuel tank and/or the like due to change in the pressure of the fuel tank.

(Patent Document 1) JP-A-H7-217504

It is noted that, in the patent document 1, the pressure control valve is opened, during an engine is in operation, only when the pressure of the fuel tank increases beyond a predetermined positive pressure value or decreases below a predetermined negative pressure value. It is assumable to employ the configuration of the patent document 1 in a vehicle, such as a plug-in hybrid car (PHV), in which an engine is seldom activated. In such a case, the valve may not be activated for a long time period. Consequently, the valve may cause seizure.

SUMMARY

It is an object of the present disclosure to produce a solenoid valve control device and a solenoid valve control method enabling to avoid seizure of a solenoid valve in a sealed tank system.

According to an aspect of the present disclosure, a sealed tank system includes a fuel tank configured to store fuel. The sealed tank system further includes an internal pressure sensor configured to detect an internal pressure of the fuel tank. The sealed tank system further includes a solenoid valve configured to close to seal the fuel tank and configured to open to open the fuel tank. A solenoid valve control device for the sealed tank system comprises an internal pressure acquisition unit configured to acquire an internal pressure of the fuel tank from the internal pressure sensor. The solenoid valve control device further comprises a drive control unit configured to control the solenoid valve to open when the internal pressure of the fuel tank is greater than or equal to a first predetermined value, which is a negative value, and is less than a second predetermined value, which is 0 or a positive value.

According to another aspect of the present disclosure, a sealed tank system includes a fuel tank configured to store fuel. The sealed tank system further includes an internal pressure sensor configured to detect an internal pressure of the fuel tank. The sealed tank system further includes a solenoid valve configured to close to seal the fuel tank and configured to open to open the fuel tank. A solenoid valve control method for the sealed tank system comprises acquiring, in an internal pressure acquisition step, an internal pressure of the fuel tank from the internal pressure sensor. The solenoid valve control method further comprises controlling, in a drive control step, the solenoid valve to open when the internal pressure of the fuel tank is greater than or equal to a first predetermined value, which is a negative value, and is less than a second predetermined value, which is 0 or a positive value.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION

As follows, a solenoid valve control device according to the present disclosure will be described with reference to drawings.

(Embodiment)

Figure 1:
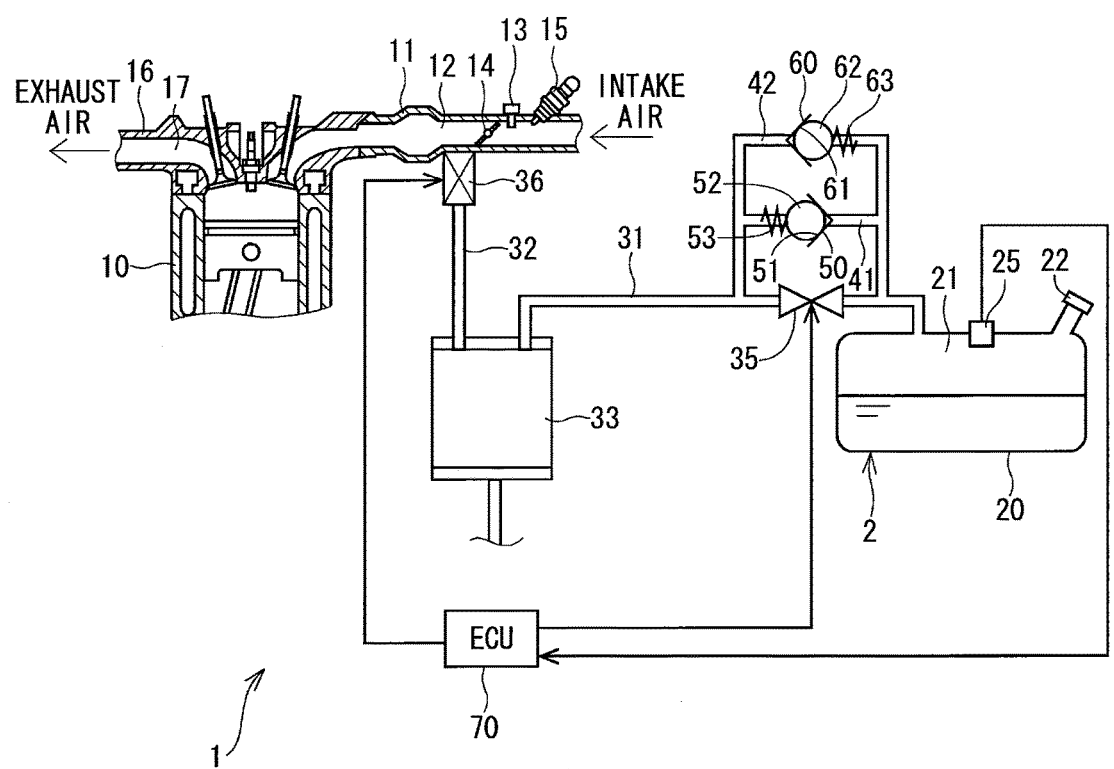
FIG. 1 is a schematic diagram showing a solenoid valve control device according to an embodiment of the present disclosure.

As shown in FIG. 1, an electronic control unit (ECU) 70 is configured to control a solenoid valve 35 equipped to a sealing tank system 2. The ECU 70 functions as a solenoid valve control device according to an embodiment of the present disclosure. In the present embodiment, the solenoid valve 35 is employed in a vapor fuel processing apparatus 1.

The vapor fuel processing apparatus 1 is employed in an air intake system of an internal combustion engine 10, which is equipped to, for example a vehicle. The engine 10 is connected with an intake pipe 11. The intake pipe 11 defines an air intake passage 12 therein. The intake pipe 11 opens to the atmosphere at an opposite side from the engine 10. In the present configuration, air is drawn into the engine 10 through the air intake passage 12. The engine 10 draws air as intake air. The intake pipe 11 is equipped with an intake air pressure sensor 13, which detects an intake air pressure in the intake pipe 11. The intake air pressure sensor 13 sends a signal to the ECU 70 according to the intake air pressure in the intake pipe 11.

The intake pipe 11 is equipped with a throttle valve 14, which opens and closes the intake air passage 12. The throttle valve 14 opens and closes the intake air passage 12 thereby to control a quantity of intake air drawn into the engine 10. In the present embodiment, an injector 15 is equipped to the intake pipe 11 on an opposite side from the engine 10 through the throttle valve 14. The injector 15 is configured to inject fuel, which is stored in a fuel tank 20, into the intake air passage 12. Fuel, which is injected from the injector 15 into the intake air passage 12, flows together with intake air into the engine 10. The fuel flowing into the engine 10 burns in a combustion chamber of the engine 10. Thereafter, the burned fuel is exhausted through an exhaust passage 17, which is formed in the exhaust pipe 16, to the atmosphere.

The fuel tank 20 accumulates liquid fuel such as gasoline. The fuel tank 20 has an upper space 21 filled with evaporated fuel, which is vapor caused from a liquid surface of the accumulated fuel. The fuel tank 20 has a fill opening 22, which can be opened and closed with a lid or the like. The fuel tank 20 is supplied with fuel through the fill opening 22. The fuel tank 20 is equipped with an internal pressure sensor 25, which is configured to detect an internal pressure of the fuel tank 20. The fuel tank 20 is sealed with a solenoid valve 35 to configure a sealed tank system 2.

The vapor fuel processing apparatus 1 is equipped with a canister passage 31, an evaporated fuel passage 32, a canister 33, the solenoid valve 35, a purge valve 36, a first bypass passage 41, a second bypass passage 42, a first relief valve 50, a second relief valve 60, the ECU 70, and/or the like.

The canister passage 31 is equipped to connect the upper space 21 of the fuel tank 20 with the canister 33. The evaporated fuel passage 32 connects the canister 33 with the intake air passage 12 of the intake pipe 11. In the present embodiment, an end of the evaporated fuel passage 32 on an opposite side from the canister 33 is connected to an intermediate portion of the intake pipe 11. The intermediate portion of the intake pipe 11 is closer to the engine 10 relative to the throttle valve 14. In the present configuration, evaporated fuel caused in the fuel tank 20 is enabled to flow through the canister passage 31, the canister 33, and the evaporated fuel passage 32 into the intake air passage 12.

The canister 33 adsorbs and holds a part of evaporated fuel, which flows through the canister passage 31 and the evaporated fuel passage 32. The evaporated fuel, which is adsorbed and held in the canister 33, is partially removed from the canister 33 and to flow through the evaporated fuel passage 32 into the intake air passage 12.

The solenoid valve 35 is an electromagnetically operated control valve equipped to the canister passage 31. The solenoid valve 35 is a normally-close valve configured to close in a de-activated state and to open in an activated state. The solenoid valve 35 is configured to close thereby to seal the fuel tank 20 and to open thereby to communicate the fuel tank 20 with its outside. The solenoid valve 35 is configured to open thereby to communicate the canister passage 31 and to close thereby to blockade the canister passage 31. In the present configuration, the solenoid valve 35 permits and prohibits flow of evaporated fuel from the fuel tank 20 through the canister passage 31 into the canister 33.

The purge valve 36 is, for example, an electromagnetically operated control valve equipped to the evaporated fuel passage 32 at a location close to the intake pipe 11. The purge valve 36 is a normally-close valve type configured to close in a de-activated state and to open in an activated state. The purge valve 36 is configured to open thereby to communicate the evaporated fuel passage 32 and to close thereby to blockade the evaporated fuel passage 32. In the present configuration, the purge valve 36 permits or prohibits flow of evaporated fuel from the canister 33 through the evaporated fuel passage 32 into the intake air passage 12.

The first bypass passage 41 is equipped to connect a port of the solenoid valve 35 on a side of the fuel tank 20 with a port of the solenoid valve 35 on a side of the canister 33.

Similarly to the first bypass passage 41, the second bypass passage 42 is equipped to connect the port of the solenoid valve 35 on the side of the fuel tank 20 with the port of the solenoid valve 35 on the side of the canister 33. That is, both the first bypass passage 41 and the second bypass passage 42 are equipped to bypass the solenoid valves 35 and to be in parallel with each other.

The first relief valve 50 is equipped to the first bypass passage 41. The first relief valve 50 is a positive-pressure relief valve configured to open when an internal pressure of the fuel tank 20 becomes higher than a predetermined upper limit. The first relief valve 50 includes a first valve seat 51, a first valve element 52, a first biasing member 53, and/or the like. The first biasing member 53 biases the first valve element 52 in a direction in which the first valve element 52 is seated on the first valve seat 51, that is, in a valve-close direction. The first valve element 52 is lifted from the first valve seat 51 against a biasing force of the first biasing member 53 when the internal pressure of the fuel tank 20 becomes higher than a predetermined upper limit. In this way, the first relief valve 50 opens. The first valve element 52 is seated on the first valve seat 51 by being applied with a biasing force of the first biasing member 53 toward the first valve seat 51 when the internal pressure of the fuel tank 20 becomes lower than the predetermined upper limit. In this way, the first relief valve 50 closes.

That is, the first valve element 52 is seated on the first valve seat 51 thereby to close the first relief valve 50 and to prohibit flow of fluid through the first bypass passage 41. The first valve element 52 is lifted from the first valve seat 51 thereby to open the first relief valve 50 and to permit flow of fluid through the first bypass passage 41. In the present configuration, when the internal pressure of the fuel tank 20 becomes higher than the predetermined upper limit, the first relief valve 50 opens to flow air, which includes evaporated fuel in the fuel tank 20, into the canister 33. In this way, the internal pressure of the fuel tank 20 is decreased, thereby to maintain the internal pressure of the fuel tank 20 at a pressure less than or equal to the predetermined upper limit. Therefore, even when, for example, a temperature around the fuel tank 20 increases, the present configuration is enabled to restrict the internal pressure of the fuel tank 20 from becoming higher than the predetermined upper limit. The predetermined upper limit may be an upper limit of the internal pressure of the fuel tank 20 at which breakage does not occur in the fuel tank 20.

The second relief valve 60 is equipped to the second bypass passage 42. The second relief valve 60 is a negative-pressure relief valve configured to open when the internal pressure of the fuel tank 20 becomes lower than a predetermined lower limit. The second relief valve 60 includes a second valve seat 61, a second valve element 62, a second biasing member 63, and/or the like. The second biasing member 63 biases the second valve element 62 in a direction in which the second valve element 62 is seated on the second valve seat 61, that is, in a valve-close direction. The second valve element 62 is lifted from the second valve seat 61 against a biasing force of the second biasing member 63 when the internal pressure of the fuel tank 20 becomes lower than the predetermined lower limit. In this way, the second relief valve 60 opens. The second valve element 62 is seated on the second valve seat 61 by being applied with a biasing force of the second biasing member 63 toward the second valve seat 61 when the internal pressure of the fuel tank 20 becomes higher than the predetermined lower limit. In this way, the second relief valve 60 closes.

That is, the second valve element 62 is seated on the second valve seat 61 thereby to close the second relief valve 60 to prohibit flow of fluid through the second bypass passage 42. The second valve element 62 is lifted from the second valve seat 61 thereby to open the second relief valve 60 to permit flow of fluid through the second bypass passage 42. In the present configuration, when the internal pressure of the fuel tank 20 becomes lower than the predetermined lower limit, the second relief valve 60 opens to flow air, which includes evaporated fuel, from the canister 33 into the fuel tank 20. Thus, the internal pressure of the fuel tank 20 increases to maintain the internal pressure of the fuel tank 20 at a pressure greater than or equal to the predetermined lower limit. Therefore, even when, for example, a temperature around the fuel tank 20 decreases, the present configuration is enabled to restrict the internal pressure of the fuel tank 20 from becoming lower than the predetermined lower limit. The predetermined lower limit may be an lower limit of the internal pressure of the fuel tank 20 at which breakage does not occur in the fuel tank 20.

In the present embodiment, the first relief valve 50 and the second relief valve 60 are equipped to enable to maintain the internal pressure of the fuel tank 20 within a predetermined range from the predetermined lower limit to the predetermined upper limit, even when a temperature around the fuel tank 20 changes. The present configuration enables to avoid breakage of the fuel tank 20, such as a crack, without excessive reinforcement of the fuel tank 20. In addition, the present configuration is effective to reduction in weight of the fuel tank 20.

The ECU 70 is a small-sized computer including a computation unit, such as a CPU, a storage unit, such as a ROM and/or a RAM, an input-and-output unit, and/or the like. The ECU 70 is configured to execute a program stored in the ROM and/or the RAM thereby to control various components and various devices of the vehicle according to signals sent from various sensors equipped to the vehicle.

In the present embodiment, the ECU 70 controls operations of the solenoid valve 35 and the purge valve 36. When electric power is supplied to the solenoid valve 35 from a battery (not shown) in response to an instruction from the ECU 70, the solenoid valve 35 turns into an activated state (valve-open state). When the solenoid valve 35 opens, air including evaporated fuel in the fuel tank 20 flows into the canister 33, and the evaporated fuel is adsorbed in the canister 33. To the contrary, when electric power supplied from the battery to the solenoid valve 35 is stopped in response to an instruction from the ECU 70, the solenoid valve 35 turns into a de-activated state (valve-close state). Thus, the fuel tank 20 turns into a sealed state. In this way, the solenoid valve 35 functions as a part of the sealed tank system 2, which is configured to seal the fuel tank 20.

The ECU 70 receives a signal, which corresponds to an intake air pressure in the intake pipe 11, from the intake air pressure sensor 13. In a condition where the intake air passage 12 is in a negative pressure, when electric power is supplied from the battery to the purge valve 36, in response to an instruction from the ECU 70, the purge valve 36 turns into an activated state (valve-open state). When the purge valve 36 opens, evaporated fuel, which is absorbed in the canister 33, flows through the purge valve 36 and the intake air passage 12 into the engine 10. The present configuration enables evaporated fuel in the fuel tank 20 to flow through the canister passage 31, the solenoid valve 35, the canister 33, the evaporated fuel passage 32, the purge valve 36, and the intake air passage 12 into the engine 10 thereby to burn the evaporated fuel in the engine 10. Thus, evaporated fuel in the fuel tank 20 can be purged. The ECU 70 calculates a target purge quantity according to an operation state of the engine 10. The ECU 70 further controls operation of the solenoid valve 35 and the purge valve 36 according to the target purge quantity.

The ECU 70 further acquire, for example, a signal, which represents that an opener of the fill opening 22 is manipulated. In this case, the ECU 70 further controls to open the solenoid valve 35, when fuel is supplied, according to the acquired signal. The present configuration restricts fuel in the fuel tank 20 from overflowing through the fill opening 22. It is noted that, in this case, the ECU 70 controls to close the solenoid valve 35 after completion of fuel supply.

As described above, the solenoid valve 35 is closed to seal the fuel tank 20 in a condition other than a state where the engine is in operation and/or fuel is supplied. It is assumable to employ such a sealed tank system 2 of the present embodiment in a vehicle, such as a PHV, which seldom activates the engine 10. In such a case, the solenoid valve 35 is also seldom activated. Consequently, the solenoid valve 35 may cause seizure therein. In consideration of these subjects, in the present embodiment, the ECU 70 implements a drive control processing shown in FIG. 2 in order to periodically activate the solenoid valve 35. This drive control processing is implemented at a predetermined interval, such as 30 minutes.

At the first step S101, it is determined whether the engine 10 is in operation. When it is determined that the engine 10 is in operation (S101: YES), processing subsequent to S102 is not executed. When it is determined that the engine 10 is not in operation (S101: NO), the processing proceeds to S102.

At S102, an internal pressure P of the fuel tank 20 is acquired from the internal pressure sensor 25. At S103, it is determined whether the internal pressure P of the fuel tank 20 is substantially equal to 0 (atmospheric pressure). In the present embodiment, when the internal pressure P of the fuel tank 20 is greater than or equal to a first predetermined value A and is less than a second predetermined value B, it is determined that the internal pressure P of the fuel tank 20 is substantially 0. That is, it is determined that the internal pressure P of the fuel tank 20 is substantially 0 in a condition where $A \leq P < B$ is satisfied. The first predetermined value A is a negative value. The second predetermined value B is 0 or a positive value. It is noted that, each of the first predetermined value A and the second predetermined value B is set at a value close to 0. For example, the first predetermined value A may be set at −1 kPa, and the second predetermined value B may be set at 1 kPa. When it is determined that the internal pressure P of the fuel tank 20 is not substantially 0 (S103: NO), processing subsequent to S104 is not executed. Alternatively, when it is determined that the internal pressure P of the fuel tank 20 is substantially 0 (S103: YES), the processing proceeds to S104.

At S104, a counted value of a counter is incremented. At S105, it is determined whether the counted value of the counter reaches a predetermined value. The predetermined value may be set arbitrarily. When it is determined that the counted value of the counter does not reach the predetermined value (S105: NO), the processing of S106 is not executed. Alternatively, when it is determined that the counted value of the counter reaches the predetermined value (S105: YES), the processing proceeds to S106.

At S106, the solenoid valve 35 is opened, and thereafter, the solenoid valve 35 is closed promptly. It is assumable that the predetermined value related to the determination at S105 is set at, for example, 4. In such a case, the solenoid valve 35 is opened in one of four occasions where the internal pressure P of the fuel tank 20 becomes 0. In other words, the ECU 70 opens the solenoid valve 35 at a predetermined frequency in a case where the internal pressure P of the fuel tank 20 is greater than or equal to the first predetermined value A and is less than the second predetermined value B. It is noted that, in the present embodiment, the solenoid valve 35 is opened when the internal pressure P of the fuel tank 20 is substantially 0. Therefore, change in the internal pressure P of the fuel tank 20 due to the opening of the solenoid valve 35 hardly occurs.

Figure 3:
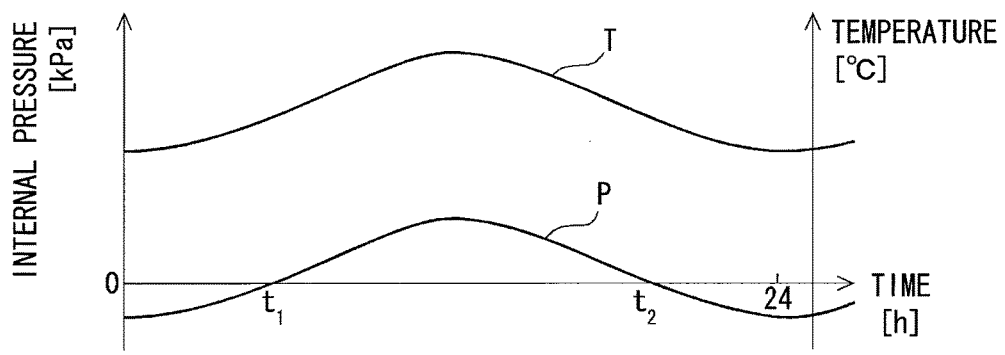
FIG. 3 is a view showing a change in an internal pressure of a fuel tank according to the embodiment of the present disclosure.

As follows, change in the internal pressure of the fuel tank 20 will be described. As shown in FIG. 3, the internal pressure P of the fuel tank 20 changes with day-to-day variation in an atmospheric temperature T. That is, the internal pressure P of the fuel tank 20 increases with increase in the atmospheric temperature T, and the internal pressure P of the fuel tank 20 decreases with decrease in the atmospheric temperature T. In addition, supposing that the internal pressure P of the fuel tank 20 substantially becomes 0 at a time point t1, and the atmospheric temperature at a time point t2 becomes substantially the same as the atmospheric temperature at the time point t1, the internal pressure P of the fuel tank 20 substantially becomes 0 at the time point t2.

Figure 4:
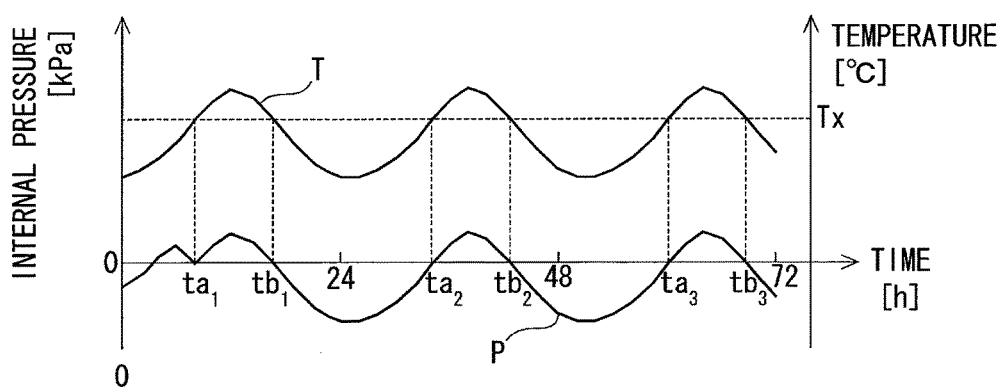
FIG. 4 is a view showing a change in the internal pressure of the fuel tank according to the embodiment of the present disclosure.

In addition, as shown in FIG. 4, when oil is supplied at, for example, a time point ta1, the solenoid valve 35 and the fill opening 22 are opened for permitting the oil supply. At this time, the internal pressure P of the fuel tank 20 substantially becomes 0. In addition, at the time point tb1, at which the atmospheric temperature T substantially becomes the atmospheric temperature Tx at the time point ta1, the internal pressure P of the fuel tank 20 also substantially becomes 0. Furthermore, supposing that the atmospheric temperature T changes substantially periodically at 24-hours interval, the internal pressure P of the fuel tank 20 substantially becomes 0, periodically. More specifically, for example, the internal pressure P of the fuel tank 20 substantially becomes 0, periodically, at the time points ta2 and tb2 in the next day, and at the time points ta3 and tb3 in the subsequent day, at which the atmospheric temperature substantially becomes the atmospheric temperature Tx at the time point of oil supply.

The inventor noted that the time point, at which the internal pressure P of the fuel tank 20 substantially becomes 0, periodically occurs, with the day-to-day variation in the atmospheric temperature T, as described above. Thus, in the present embodiment, the solenoid valve 35 is controlled to be opened when the internal pressure P of the fuel tank 20 substantially becomes 0. The present configuration enables to activate the solenoid valve 35 periodically. Therefore, even in a vehicle such as PHV, in which the engine 10 may not be activated for a long time period, seizure of the solenoid valve 35, which is caused due to being kept closed for a long time period, can be avoided.

In addition, the present configuration controls the solenoid valve 35 to open when the internal pressure P of the fuel tank 20 substantially becomes 0. Therefore, the present configuration enables to restrict evaporated fuel from being discharged into the canister 33. It is noted that, when it is desirable to restrict the evaporated from being discharged into the canister 33 as much as possible, the second predetermined value B may be set at 0. In this case, the solenoid valve 35 is controlled to be opened when the internal pressure P of the fuel tank 20 is in a negative pressure at a value close to 0.

Figure 5:
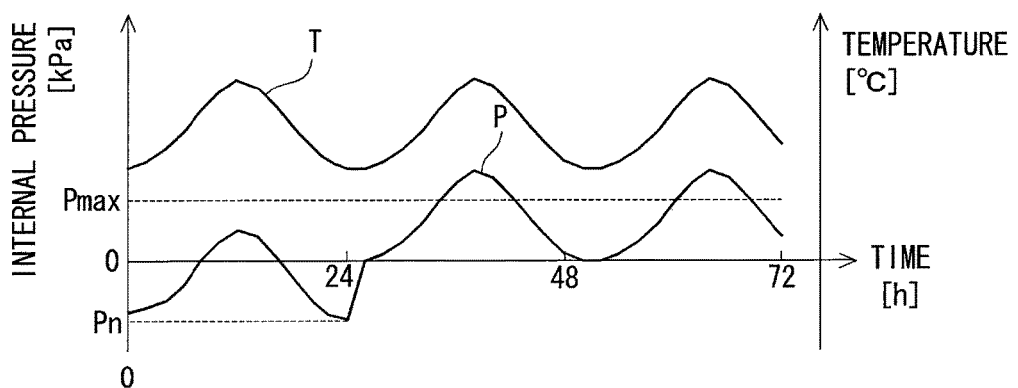
FIG. 5 is a view showing a change in an internal pressure of a fuel tank according to a reference example.

Furthermore, in a case where, for example, it is noted only to the restrict discharge of evaporated fuel toward the canister 33, it is conceivable to control the solenoid valve 35 to open when the internal pressure P of the fuel tank 20 is in a negative pressure. More specifically, FIG. 5 shows a reference example in which the solenoid valve 35 is controlled to be opened when the internal pressure P of the fuel tank 20 is at a predetermined negative pressure Pn, which is a negative pressure and is not close to 0. The predetermined negative pressure Pn is, for example, −10 kPa. In such a configuration, the internal pressure P of the fuel tank 20 substantially increases to 0 with the open of the solenoid valve 35. Subsequently, it is supposed that the atmospheric temperature T increases, and the internal pressure P of the fuel tank 20 also increases with the increase in the atmospheric temperature T. In such a case, the internal pressure P of the fuel tank 20 may excessively increase in a configuration, in which, for example, the first relief valve 50 is not equipped. As a result, the internal pressure P of the fuel tank 20 may exceed a maximum internal pressure Pmax of the fuel tank 20. Thus, the fuel tank 20 may be damaged. In consideration of avoidance of such a breakage of the fuel tank 20, it is conceivable to enhance a mechanical strength of the fuel tank 20 further than a strength as needed. Nevertheless, such an excessive reinforcement of the fuel tank 20 may not be desirable in view of its manufacturing cost, its weight, and/or the like. Furthermore, in a configuration where the solenoid valve 35 is opened when the internal pressure P of the fuel tank 20 is at the predetermined negative pressure Pn, the internal pressure P of the fuel tank 20 increases. In such a case, the internal pressure P of the fuel tank 20 less frequently decreases to become the predetermined negative pressure Pn, or the internal pressure P of the fuel tank 20 does not become the predetermined negative pressure Pn. Therefore, in such a case, the solenoid valve 35 is less frequently opened, or the solenoid valve 35 is not opened to cause seizure of the solenoid valve 35.

In consideration of these subjects, in the present embodiment, the solenoid valve 35 is controlled to be opened, when the internal pressure P of the fuel tank 20 is substantially at 0. The present configuration enables to reduce change in the internal pressure P of the fuel tank 20 with the opening of the solenoid valve 35. Therefore, the present configuration is enabled to cause a time point, at which the internal pressure P of the fuel tank 20 substantially becomes 0, periodically with the day-to-day variation in the atmospheric temperature T. Thus, the present configuration is enabled to activate the solenoid valve 35 appropriately.

As described above in detail, the ECU 70 of the present embodiment is configured to control the solenoid valve 35. The solenoid valve 35 is employed in the sealed tank system 2, which includes the fuel tank 20, the internal pressure sensor 25, and the solenoid valve 35. The fuel tank 20 stores fuel. The internal pressure sensor 25 detects the internal pressure P of the fuel tank 20. The solenoid valve 35 is configured to close to seal the fuel tank 20. The solenoid valve 35 is further configured to open to open the fuel tank 20. The ECU 70 executes the following processings. The ECU 70 executes the processing (S102) to acquire the internal pressure P of the fuel tank 20 from the internal pressure sensor 25. The ECU 70 further executes the processing (S106) to control the solenoid valve 35 to open, when the internal pressure P of the fuel tank 20 is greater than or equal to the first predetermined value A and is less than the second predetermined value B. The first predetermined value A is a negative value. The second predetermined value B is 0 or a positive value.

The internal pressure P of the fuel tank 20 substantially becomes 0 (atmospheric pressure) at the time of, for example, oil supply and/or the like. In addition, in a case where the fuel tank 20 is continually sealed subsequent to the oil supply, the internal pressure P of the fuel tank 20 periodically changes around 0 with the day-to-day variation in the atmospheric temperature T. In consideration of this, the configuration of the present embodiment controls the solenoid valve 35 to open when the internal pressure P of the fuel tank 20 is greater than or equal to the first predetermined value A and is less than the second predetermined value B. The first predetermined value A is a negative value. The second predetermined value B is 0 or a positive value. In the present configuration, even in a vehicle, such as a PHV, in which the engine 10 is seldom activated, the solenoid valve 35 is opened at a suitable frequency. Therefore, seizure of the solenoid valve 35 can be avoided.

In addition, the first predetermined value A and the second predetermined value B may be set at values each being close to 0. In this case, the solenoid valve 35 may be opened when the internal pressure P of the fuel tank 20 is substantially 0. In this way, discharge of the evaporated fuel from the solenoid valve 35 can be restricted when the opened solenoid valve 35 is opened. In particular, the second predetermined value may be set a 0. In this case, the solenoid valve 35 may be controlled to be opened when the internal pressure P of the fuel tank 20 is at a negative pressure close to zero. Thus, discharge of evaporated fuel from the solenoid valve 35 can be further effectively restricted.

In the present embodiment, the solenoid valve 35 is opened at a predetermined frequency in a case where the internal pressure P of the fuel tank 20 is greater than or equal to the first predetermined value A and is less than the second predetermined value B. The present configuration enables the solenoid valve 35 to open at a desired frequency.

The solenoid valve 35 is equipped to the canister passage 31. The canister passage 31 communicates with the canister 33, which is configured to store evaporated fuel, which is caused by evaporation of fuel. The present configuration enables to cause the canister 33 to absorb evaporated fuel, which is emitted when the solenoid valve 35 is opened. Thus, evaporated fuel can be restricted from being discharged to the atmosphere.

In the present embodiment, the ECU 70 may be one example of an internal pressure acquisition unit and a drive control unit. S102 in FIG. 2 may be one example of a processing, which constitutes a function of the internal pressure acquisition unit. S106 in FIG. 2 may be one example of a processing, which constitutes a function of the drive control unit.

Figure 2:
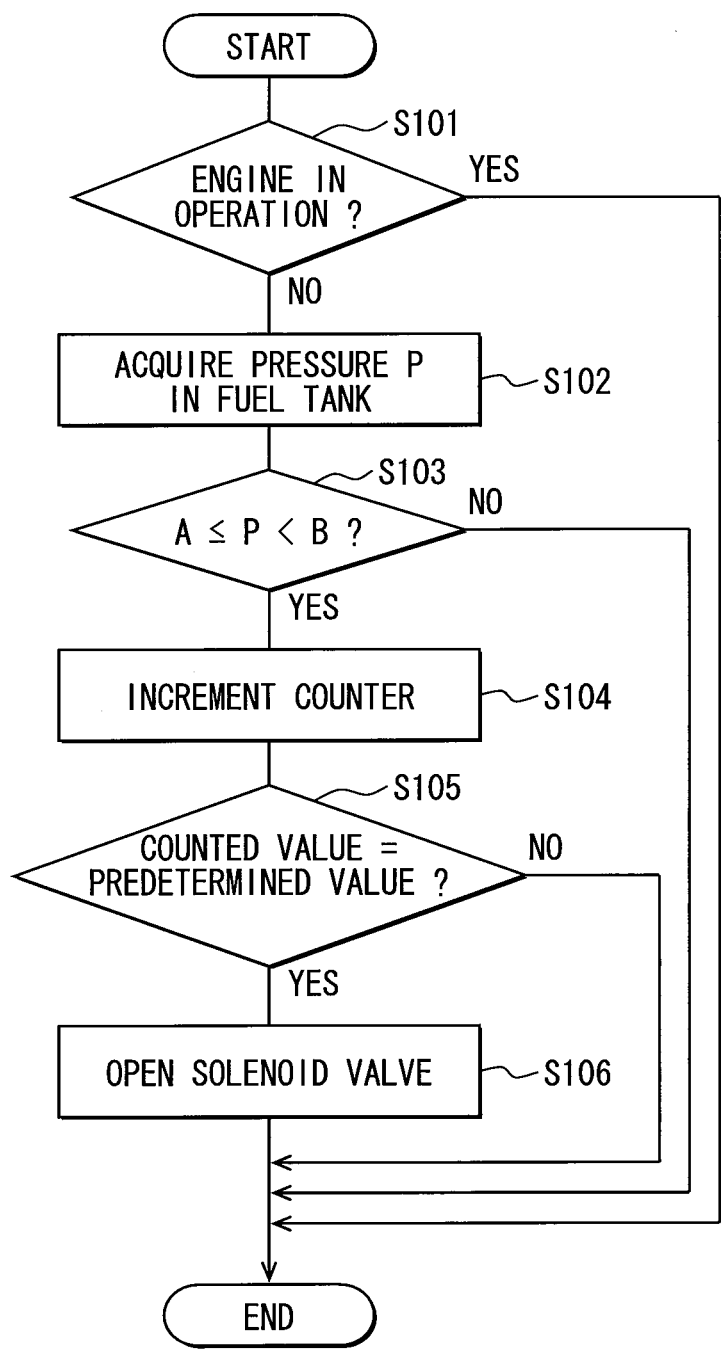
FIG. 2 is a flow chart showing a control processing executed by the solenoid valve control device according to the embodiment of the present disclosure.

S102 in FIG. 2 may be one example of an internal pressure acquisition step, and S106 in FIG. 2 may be one example of a drive control step in a solenoid valve control method to produce an effect similarly to the internal pressure acquisition unit and the drive control unit, respectively.

(Other Embodiment)

(a) In the above-described embodiment, the solenoid valve is opened, when the condition, where the internal pressure of the fuel tank is greater than or equal to the first predetermined value and is less than the second predetermined value, is satisfied for the predetermined times. It is noted that, in another embodiment, the solenoid valve may be opened regularly, when the internal pressure of the fuel tank is greater than or equal to the first predetermined value and is less than the second predetermined value. In this case, the predetermined value, which is related to the determination processing at S105 in FIG. 2, may be set at 1. In addition, or alternatively, the processings are S104 and S105 may be omitted.

(b) In the above-described embodiment, the solenoid valve is equipped to the evaporated fuel passage, which communicates with the canister configured to store evaporated fuel. That is, in above-described embodiment, the solenoid valve constitutes a part of the vapor fuel processing apparatus. It is noted that, in another embodiment, the solenoid valve may be equipped to another place other than the vapor fuel processing apparatus, as long as the solenoid valve is configured to seal the fuel tank and is configured to control the internal pressure of the fuel tank.

(c) In the above-described embodiment, the solenoid valve control device is equipped to a PHV. In other embodiment, the solenoid valve control device may be equipped to another apparatus than a PHV.

The solenoid valve control device according to the present disclosure is configured to control the solenoid valve in the sealed tank system. The sealed tank system includes the fuel tank, the internal pressure sensor, and the solenoid valve. The fuel tank is configured to store fuel. The internal pressure sensor is configured to detect the internal pressure of the fuel tank. The solenoid valve is configured to close to seal the fuel tank and configured to open to open the fuel tank. The solenoid valve control device includes the internal pressure acquisition unit and the drive control unit. The internal pressure acquisition unit is configured to acquire the internal pressure of the fuel tank from the internal pressure sensor. The drive control unit is configured to control the solenoid valve to open when the internal pressure of the fuel tank is greater than or equal to the first predetermined value and is less than the second predetermined value. The first predetermined value is a negative value. The second predetermined value is 0 or a positive value.

The internal pressure of the fuel tank substantially becomes 0 (atmospheric pressure) at the time of, for example, oil supply and/or the like. In addition, in a case where the fuel tank is continually sealed subsequent to the oil supply, the internal pressure of the fuel tank periodically changes around 0 with the day-to-day variation in the atmospheric temperature. In consideration of this, the present configuration controls the solenoid valve to open when the internal pressure of the fuel tank is greater than or equal to the first predetermined value and is less than the second predetermined value. The first predetermined value is a negative value. The second predetermined value is 0 or a positive value. In the present configuration, even in a vehicle, such as a PHV, in which the engine is seldom activated, the solenoid valve is opened at a suitable frequency. Therefore, seizure of the solenoid valve can be avoided. In addition, the first predetermined value and the second predetermined value may be set at values each being 0 or close to 0. In this case, the solenoid valve may be opened when the internal pressure of the fuel tank is substantially 0. In this way, discharge of the evaporated fuel from the solenoid valve can be restricted when the opened solenoid valve is opened.

The solenoid valve control method may include the internal pressure acquisition step, which is similar to the above-described internal pressure acquisition unit, and the drive control step, which is similar to the drive control unit. The solenoid valve control method also produces a similar effect to the solenoid valve control device.

It should be appreciated that while the processes of the embodiments of the present disclosure have been described herein as including a specific sequence of steps, further alternative embodiments including various other sequences of these steps and/or additional steps not disclosed herein are intended to be within the steps of the present disclosure.

While the present disclosure has been described with reference to preferred embodiments thereof, it is to be understood that the disclosure is not limited to the preferred embodiments and constructions. The present disclosure is intended to cover various modification and equivalent arrangements. In addition, while the various combinations and configurations, which are preferred, other combinations and configurations, including more, less or only a single element, are also within the spirit and scope of the present disclosure.

What is claimed is:

1. A solenoid valve control device for a sealed tank system, the sealed tank system including:
   a fuel tank configured to store fuel;
   an internal pressure sensor configured to detect an internal pressure of the fuel tank; and
   a solenoid valve configured to close to seal the fuel tank and configured to open to open the fuel tank,
   the solenoid valve control device comprising:
   an internal pressure acquisition unit configured to acquire an internal pressure of the fuel tank from the internal pressure sensor; and
   a drive control unit configured to control the solenoid valve to open when the internal pressure of the fuel tank is greater than or equal to a first predetermined value, which is a negative value, and is less than a second predetermined value, which is 0 or a positive value, wherein
   the drive control unit is further configured to (i) count a number of times when the internal pressure of the fuel tank becomes greater than or equal to the first predetermined value and less than the second predetermined value with the day-to-day variation in an atmospheric temperature, and (ii) open the solenoid valve when the counted number of times reaches a predetermined value.

2. The solenoid valve control device according to claim 1, wherein the second predetermined value is 0.

3. The solenoid valve control device according to claim 1, wherein the solenoid valve is equipped to a canister passage, which communicates with a canister, the canister being configured to store evaporated fuel, which is caused by evaporation of the fuel.

4. The solenoid valve control device according to claim 1, wherein
   the drive control unit is further configured to determine whether the internal pressure is greater than or equal to the first predetermined value and whether the internal pressure is less than the second predetermined value, and
   when the drive control unit determines that the internal pressure is greater than or equal to the first predetermined value and that the internal pressure is less than the second predetermined value, the drive control unit controls the solenoid valve to open.

5. The solenoid valve control device according to claim 4, wherein
   the first predetermined value is −1 kPa, and
   the second predetermined value is 1 kPa.

6. The solenoid valve control device according to claim 1, wherein
   the drive control unit is further configured to determine whether the internal pressure is equal to an atmospheric pressure, and
   when the drive control unit determines that the internal pressure is equal to the atmospheric pressure, the drive control unit controls the solenoid valve to open.

7. The solenoid valve control device according to claim 1, wherein
   the drive control unit is configured to determine whether the internal pressure is greater than or equal to the first predetermined value and whether the internal pressure is less than the second predetermined value at a predetermined interval.

8. The solenoid valve control device according to claim 1, wherein
   the solenoid valve is equipped to a canister passage to communicate a canister with the fuel tank and to blockade the canister from the fuel tank.

* * * * *